US009619275B2

(12) United States Patent
Xiao (10) Patent No.: US 9,619,275 B2
(45) Date of Patent: Apr. 11, 2017

(54) DATA PROCESSING METHOD, APPARATUS AND MOBILE TERMINAL

(71) Applicant: Tencent Technology (Shenzhen) Company Limited, Shenzhen, Guangzhong (CN)

(72) Inventor: Xi Xiao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 155 days.

(21) Appl. No.: 14/152,354

(22) Filed: Jan. 10, 2014

(65) Prior Publication Data

US 2014/0130053 A1    May 8, 2014

Related U.S. Application Data

(63) Continuation of application No. PCT/CN2013/081415, filed on Aug. 13, 2013.

(30) Foreign Application Priority Data

Aug. 14, 2012  (CN) .......................... 2012 1 0288779

(51) Int. Cl.
G06F 9/44      (2006.01)
G06F 9/46      (2006.01)
G06F 9/54      (2006.01)

(52) U.S. Cl.
CPC . *G06F 9/46* (2013.01); *G06F 9/54* (2013.01)

(58) Field of Classification Search
None
See application file for complete search history.

(56) References Cited

U.S. PATENT DOCUMENTS

| 6,477,580 B1* | 11/2002 | Bowman-Amuah ......... 709/231 |
| 2007/0043730 A1* | 2/2007 | Wisely ............................ 707/10 |
| 2011/0029619 A1* | 2/2011 | Bai ................................ 709/206 |

FOREIGN PATENT DOCUMENTS

| CN | 102158853 A | 8/2011 |
| CN | 102339468 A | 2/2012 |
| CN | 102375758 A | 3/2012 |
| CN | 102541538 A | 7/2012 |
| CN | 102541538 A | 7/2012 |
| CN | 103019839 A | 4/2013 |
| CN | 103064690 A | 4/2013 |

(Continued)

OTHER PUBLICATIONS

First Office Action to Chinese Application No. 201210288779.2, dated Mar. 4, 2015, including English Summary of Office Action, (8p).

(Continued)

*Primary Examiner* — Craig Dorais
(74) *Attorney, Agent, or Firm* — Brinks Gilson & Lione (57) ABSTRACT

The present disclosure discloses a data processing method, apparatus and mobile terminal. In the data processing method, the mobile terminal performs data computation in a sub-thread of the current program when a data request is received. The mobile terminal loads the requested data in the main thread of the current program based on the data computation results and displays the loaded requested data. The present disclosure ensures the smoothness of user interface threads, the stability of systems, and the display performance of user interfaces.

12 Claims, 5 Drawing Sheets

(56) References Cited

FOREIGN PATENT DOCUMENTS

KR 10-2006-0107079 A 10/2006
WO WO2014/026602 A1 2/2014

OTHER PUBLICATIONS

Second Office Action to Chinese Application No. 201210288779.2, dated Sep. 6, 2015, including English Summary of Office Action, (4p).
International Search Report and Written Opinion issued in corresponding application PCT/CN2013/081415; (pp. 1-7), dated Feb. 20, 2014.

* cited by examiner

DATA PROCESSING METHOD, APPARATUS AND MOBILE TERMINAL

The present application is a continuation out of PCT/CN2013/081415, filed Aug. 13, 2013, which claims priority to Chinese Patent Application No. 201210288779.2, filed Aug. 14, 2012, the entireties of both of which are hereby incorporated by reference.

FIELD

The present disclosure relates generally to the field communication technologies and specifically to mobile terminal technologies and, more particularly, to a data processing method, apparatus and mobile terminal.

BACKGROUND

Currently, data processing of a mobile terminal is executed in the main thread (i.e. user interface, UI). For example, if a user requests to view data in a certain folder of a mobile terminal, upon receipt of the data request from the user, the mobile terminal: traverses data in the requested folder in the UI thread of the program and creates a data object corresponding to each datum, the data object may include information such as data name, size, revision time; sorts the data object and loads the data object to the user interface and the user interface displays the data of the folder requested by the user. In the aforesaid technique, as the data processing flow is run in the main thread of the program (i.e. the UI thread), if the requested data is relatively big, the data processing flow will be tedious and time consuming and result in UI thread jam, causing blockage and stoppage of the mobile terminal system and affecting the display of the user interface.

SUMMARY

The present disclosure provides a data processing method, apparatus and mobile terminal capable of ensuring the smoothness of user interface threads, the stability of systems, and the display performance of user interfaces.

In a first aspect, the present disclosure provides a data processing method implemented in a mobile terminal device. The mobile terminal device performs data computation in a sub-thread of the current program when a data request is received. The mobile terminal device loads the requested data in the main thread of the current program based on the data computation results. The mobile terminal device displays the loaded requested data.

In a second aspect, the present disclosure provides a data processing apparatus including a processor and a non-transitory storage medium accessible to the processor, the non-transitory storage medium is configured to store: a sub-thread control module for performing data computation in a sub-thread of the current program when a data request is received; a main thread control module for loading the requested data in the main thread of the current program based on the data computation results; and a data processing module for displaying the loaded requested data.

In a third aspect, the present disclosure provides a mobile terminal comprising the aforesaid data processing apparatus. The mobile terminal includes a processor and a non-transitory storage medium accessible to the processor, the processor is configured to perform data computation in a sub-thread of a current program when a data request is received; load the requested data in the main thread of the current program based on the data computation results; and display the loaded requested data.

As described above, in the embodiments of the present disclosure, the relatively tedious and time consuming process of data computation is run in a sub-thread of the program, and only data loading and display are run in the main thread of the program. The multithread working mode improves data processing efficiency and UI thread jam will not be caused even when the requested data is relatively big, thereby ensuring the smoothness of user interface threads, the stability of systems, and the display performance of user interfaces.

BRIEF DESCRIPTION OF THE DRAWINGS

To better illustrate preferred embodiments of the present disclosure, the drawings related thereto will be briefly described as follows. It will be apparent to those of ordinary skill in the art that the drawings illustrate only some embodiments of the present disclosure and other drawings may be acquired based on these drawings without any creative effort.

DETAILED DESCRIPTION

The preferred embodiments of the present disclosure will be further described in detail in connection with the drawings. The described embodiments are only some of the embodiments of the present disclosure, and all other embodiments acquired without any creative effort by those of ordinary skill in the art based on the embodiments of the present disclosure shall fall within the scope of protection of the present disclosure.

Figure 9:
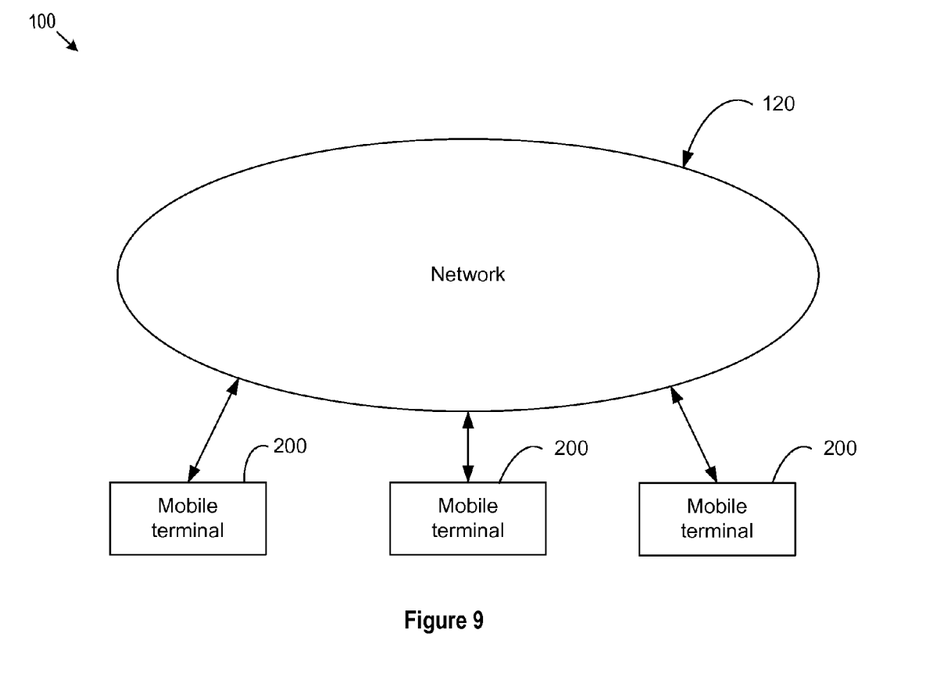
FIG. 9 shows a communication system that includes a plurality of mobile terminals configured to implement the disclosed data processing methods.
Figure 10:
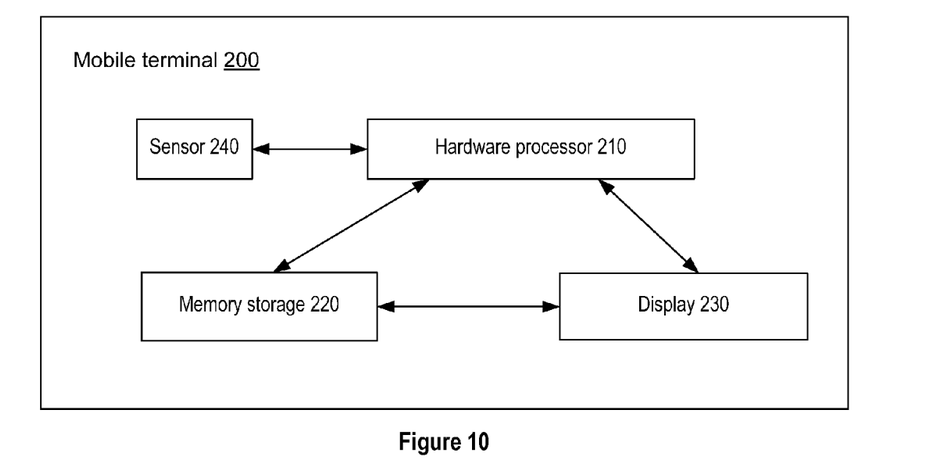
FIG. 10 shows an example of a mobile terminal configured to implement the disclosed data processing method.

In an embodiment of the present disclosure, a mobile terminal 200 shown in FIGS. 9-10 may include a tablet computer, a mobile phone, a smart mobile phone, an electronic reading device, a notebook computer, etc. The system of a mobile terminal may include Android™ system (an operating system), iOS™ system (an operating system), Windows™ Phone system (an operating system), etc.

In an embodiment of the present disclosure, a program includes at least a thread. If the program only includes a thread, that thread is the main thread or UI thread. The main thread is automatically created by the system when the program is run, and is primarily responsible for user interface display, update and control interaction. If the program includes more than one thread, then one of the threads is the main thread and the other threads are sub-threads.

In an embodiment of the present disclosure, the relatively tedious and time consuming process of data computation is run in a sub-thread of the program, and only data loading and display are run in the main thread of the program. The multithread working mode improves data processing efficiency and UI thread jam will not be caused even when the requested data is relatively big, thereby ensuring the smoothness of user interface threads, the stability of systems, and the display performance of user interfaces.

The data processing method provided by the present disclosure is described in detail in connection with FIGS. 1-4.

Figure 1:
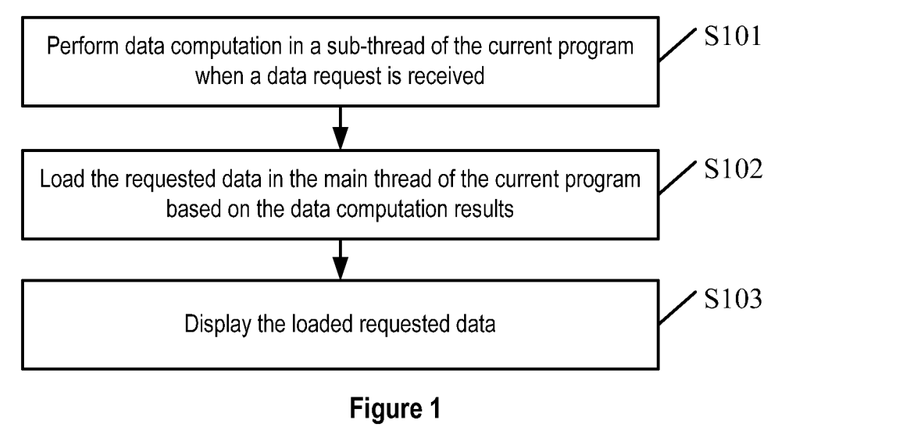
FIG. 1 is a process flow diagram of a data processing method provided by an embodiment of the present disclosure.

Referring to FIG. 1 which is a process flow diagram of a data processing method provided by an embodiment of the present disclosure and may include the following steps S101-S103.

S101—performing data computation in a sub-thread of the current program when a data request is received.

Wherein, the data request may be a data request from a user, e.g. if a user requests to view data in a certain folder of a mobile terminal, then the user may send a data request. In this step, data computation is performed in a sub-thread of the current program of the mobile terminal when a data request from the user is received.

In an embodiment of the present disclosure, the step of performing data computation in a sub-thread of the current program may include two practicable manners of implementation.

Figure 2:
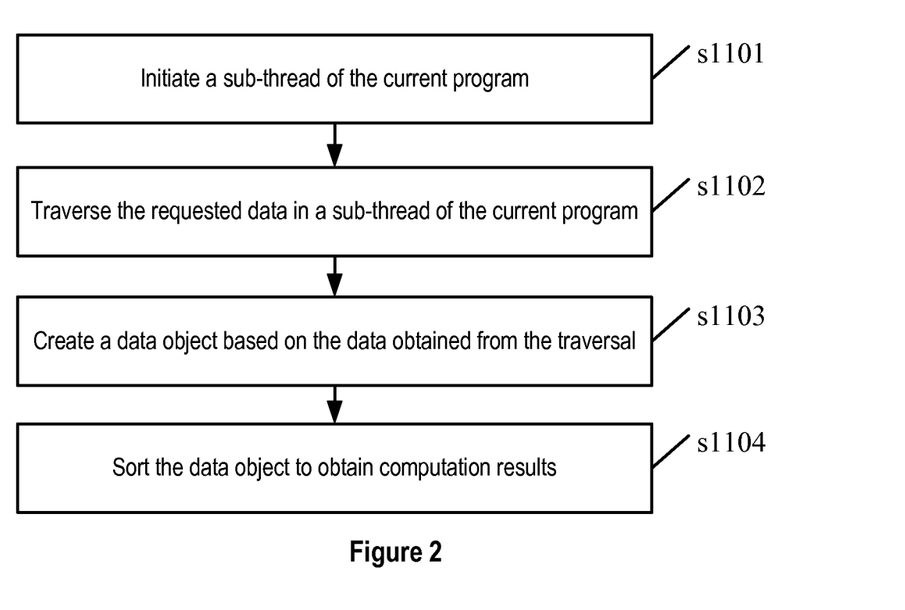
FIG. 2 is a process flow diagram of an embodiment of step S101 shown in FIG. 1.

For the first practicable manner of implementation, refer to FIG. 2 which is a process flow diagram of an embodiment of step S101 shown in FIG. 1; and step S101 may include the following steps s1101-s1104.

s1101—initiating a sub-thread of the current program. In this step, the sub-thread may be any sub-thread included in the current program.

s1102—traversing the requested data in a sub-thread of the current program.

In this step, the requested data is traversed in a sub-thread of the current program through a traversal algorithm, wherein the traversal algorithm may be ListFiles( ) algorithm, recursive algorithm, non-recursive algorithm, etc. For example, if data of a certain folder is requested, ListFiles( ) algorithm may be used to obtain all data under that folder.

s1103—creating a data object based on the data obtained from the traversal.

Wherein, the data object is an object used for displaying on the user interface, which may include data name, size, revision time. Alternatively, the data object may be stored in a local cache after being obtained.

s1104—sorting the data object to obtain computation results, the computation results including data objects obtained after sorting.

In this step, the data object may be sorted based on the information of the data. For example, the data object may be sorted according to the data revision time, data size, or data name. The sorting of data object in this step facilitates the display of the data object by the user interface for the user to browse data.

Figure 3:
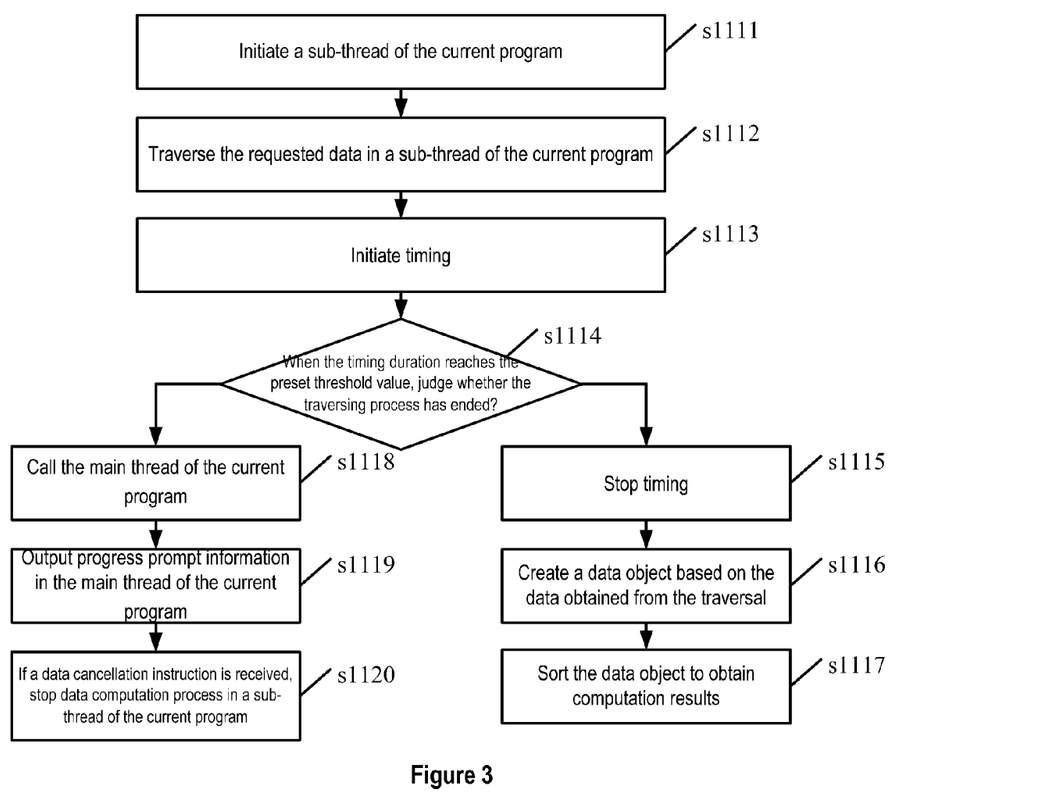
FIG. 3 is a process flow diagram of another embodiment of step S101 shown in FIG. 1.

For the second practicable manner of implementation, refer to FIG. 3 which is a process flow diagram of another embodiment of step S101 shown in FIG. 1; and step S101 may include the following steps s1111-s1120.

s1111—initiating a sub-thread of the current program.

s1112—traversing the requested data in a sub-thread of the current program.

In this implementation manner, steps s1111-s1112 are identical to steps s1101-s1102 of the embodiment shown in FIG. 2.

s1113—initiating timing.

In this implementation manner, step s1113 and step s1112 may be performed synchronously, i.e. timing may be initiated as traversing starts.

s1114—determining whether the traversing process has ended when the timing duration reaches the preset threshold value; if the determination is yes, proceed to step s1115; if the determination is no, proceed to step s1118.

s1115—stopping timing.

In steps s1113-s1115, timing may be performed by a timer. As the traversing process is quite complex, if the requested data is relatively big then the time consumed by traversing is quite long. To improve interactivity for this manner of implementation, a time threshold value may be preset. The time threshold value may be preset according to the actual time a user needs to wait. For example, the time threshold value may be set as 500 ms. If the traversing process ends when the timer has not reached the preset time threshold value, it means the traversing process for the requested data is faster and the response time is faster, and the timer may be called off to stop timing.

s1116—creating a data object based on the data obtained from the traversal.

s1117—sorting the data object to obtain computation results, the computation results including data objects obtained after sorting; and the process ends.

In this implementation manner, steps s1116-s1117 are identical to steps s1103-s1104 of the embodiment shown in FIG. 2.

s1118—calling the main thread of the current program.

s1119—outputting progress prompt information in the main thread of the current program.

In steps s1118-s1119, if the traversing process has not ended when the timer reaches the preset time threshold value, it means the requested data is relatively big, the traversing process for the requested data is slower and the response time is slower, and to improve interactivity, the main thread of the current program may be called to output progress prompt information in the main thread of the current program, to prompt the user that data is being loaded and to remind the user to wait. In an actual implementation, the progress prompt information may be displayed using progress bar so that the data computation process is visually shown.

s1120—stopping data computation process in a sub-thread of the current program if a data cancellation instruction is received.

This step is an optional step. After step s1119, the step of outputting progress prompt information in the main thread of the current program, if the user continues to wait, then the entire data processing is completed; if the user chooses not to continue to wait, then cancellation is executed, i.e. data cancellation instruction is sent, to cancel the process of data request. In this step, data computation process in a sub-thread of the current program is stopped when a data cancellation instruction is received; thereafter, the sub-thread of the current program is exited and the normal operation of the program is continued by the main thread of the current program.

S102—loading the requested data in the main thread of the current program based on the data computation results.

This step of loading the requested data may be: loading a data object corresponding to the stored requested data from a local cache.

Figure 4:
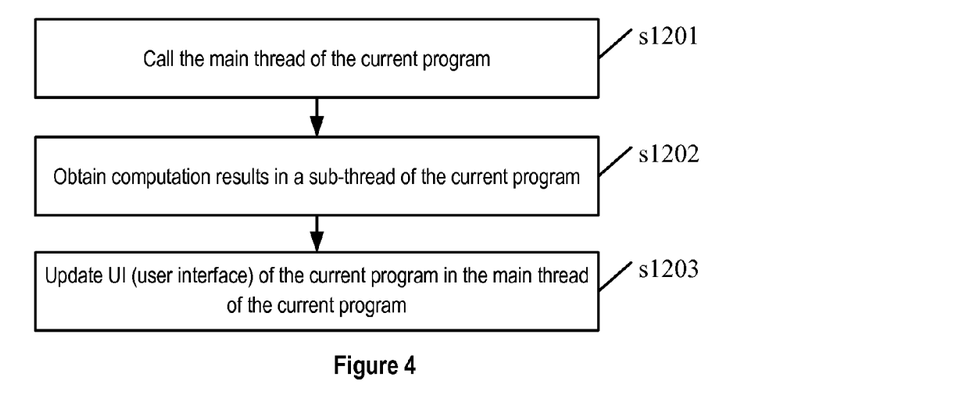
FIG. 4 is a process flow diagram of an embodiment of step S102 shown in FIG. 1.

In a practicable manner of implementation of the present disclosure, referring to FIG. 4 which is a process flow diagram of an embodiment of step S102 shown in FIG. 1; and step S102 may include the following steps s1201-s1203.

s1201—calling the main thread of the current program.

s1202—obtaining computation results in a sub-thread of the current program.

After performing data computation and obtaining computation results in a sub-thread of the current program, the computation results may be returned to the main thread of the current program by the sub-thread of the current program. Wherein, the computation results may include data objects obtained after sorting.

s1203—updating UI (user interface) of the current program in the main thread of the current program.

In this step, the process of updating UI (user interface) of the current program is actually in preparation of the display of data, i.e. loading sorted data objects in the user interface to facilitate subsequent display of data.

S103—displaying the loaded requested data.

This step displays the loaded requested data in the user interface of the current program and the user may view information of the requested data in the user interface of the current program.

In the embodiments of the present disclosure, "the current program" refers to the program currently run by a mobile terminal, which may be any program being run in the mobile terminal system.

As described above, in the embodiments of the present disclosure, the relatively tedious and time consuming process of data computation is run in a sub-thread of the program, and only data loading and display are run in the main thread of the program. The multithread working mode improves data processing efficiency and UI thread jam will not be caused even when the requested data is relatively big, thereby ensuring the smoothness of user interface threads, the stability of systems, and the display performance of user interfaces.

The data processing apparatus provided by an embodiment of the present disclosure will be described in detail in connection with FIGS. 5-8. The disclosed apparatus may be a data manager or file manager in a mobile terminal. The under-mentioned apparatus may be used in the aforementioned method.

Figure 5:
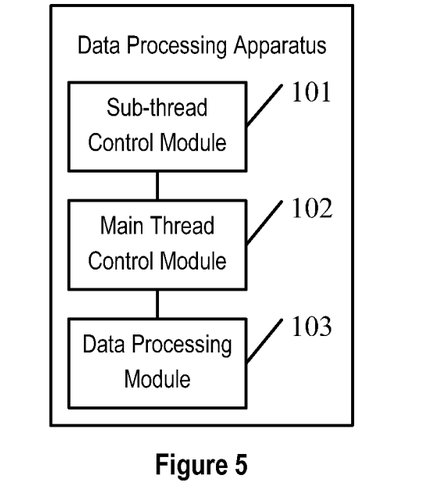
FIG. 5 is a structural block diagram of a data processing apparatus provided by an embodiment of the present disclosure.

Referring to FIG. 5, which is a structural block diagram of a data processing apparatus provided by an embodiment of the present disclosure. The apparatus may include a sub-thread control module 101, a main thread control module 102 and a data processing module 103.

The sub-thread control module 101 is used for performing data computation in a sub-thread of the current program when a data request is received.

Wherein, the data request may be a data request from a user, e.g. if a user requests to view data in a certain folder of a mobile terminal, then the user may send a data request. The sub-thread control module 101 receives a data request from the user and performs data computation on the requested data in a sub-thread of the current program of the mobile terminal.

The main thread control module 102 is used for loading the requested data in the main thread of the current program based on the data computation results.

The data processing module 103 is used for displaying the loaded requested data.

The various modules of the embodiment shown in FIG. 5 will be described in detail below.

Figure 6:
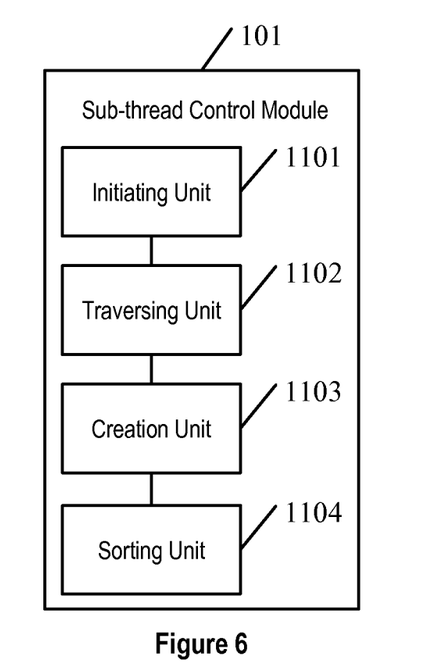
FIG. 6 is a structural block diagram of an embodiment of the sub-thread control module shown in FIG. 5.

Referring to FIG. 6, which is a structural block diagram of an embodiment of the sub-thread control module shown in FIG. 5. The sub-thread control module 101 may include an initiating unit 1101, a traversing unit 1102, a creation unit 1103 and a sorting unit 1104.

The initiating unit 1101 is used for initiating a sub-thread of the current program.

The traversing unit 1102 is used for traversing the requested data in a sub-thread of the current program.

The traversing unit 1102 traverses the requested data in a sub-thread of the current program through a traversal algorithm, wherein the traversal algorithm may be ListFiles( ) algorithm, recursive algorithm, non-recursive algorithm, etc.

The creation unit 1103 is used for creating a data object based on the data obtained from the traversal.

Wherein, the data object is an object used for displaying on the user interface, which may include data name, size, revision time. Alternatively, the data object may be stored in a local cache of the mobile terminal after being obtained.

The sorting unit 1104 is used for sorting the data object to obtain computation results, the computation results including data objects obtained after sorting.

The sorting unit 1104 sort the data object and facilitates the display of the data object by the user interface for the user to browse data.

Figure 7:
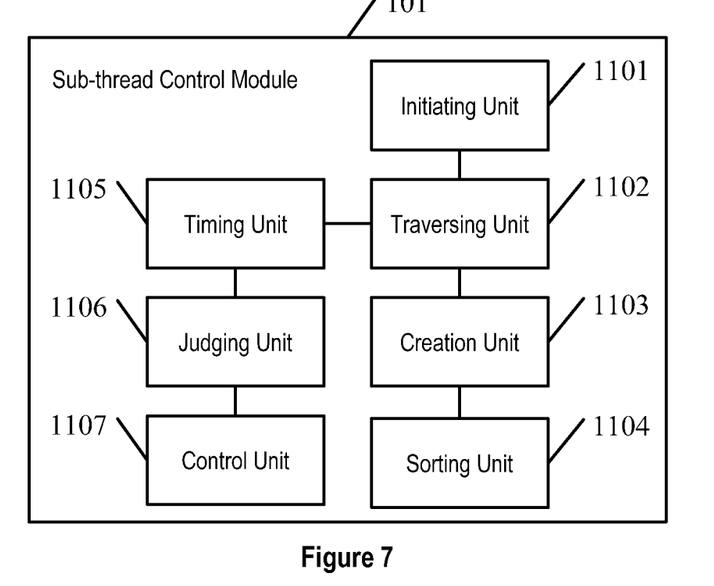
FIG. 7 is a structural block diagram of another embodiment of the sub-thread control module shown in FIG. 5.

Referring to FIG. 7, which is a structural block diagram of another embodiment of the sub-thread control module shown in FIG. 5. The sub-thread control module 101 may include an initiating unit 1101, a traversing unit 1102, a creation unit 1103, a sorting unit 1104, a timing unit 1105, a determining unit 1106 and a control unit 1107. Wherein, the initiating unit 1101, the traversing unit 1102, the creation unit 1103 and the sorting unit 1104 are as described in the embodiment of FIG. 6.

The timing unit 1105 is used for initiating timing.

The determining unit 1106 is used for determining whether the traversing process has ended when the timing duration reaches the preset threshold value.

The control unit 1107 is used for notifying the timing unit 1105 to stop timing if the determination is yes, and for notifying the main thread control module 102 to call the main thread of the current program and output progress prompt information in the main thread of the current program if the determination is no.

Alternatively, the control unit 1107 is used for stopping data computation process in a sub-thread of the current program if a data cancellation instruction is received after outputting progress prompt information in the main thread of the current program.

Figure 8:
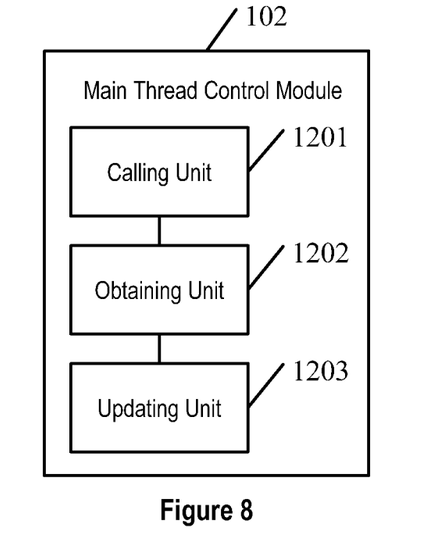
FIG. 8 is a structural block diagram of an embodiment of the main thread control module shown in FIG. 5.

Referring to FIG. 8, which is a structural block diagram of an embodiment of the main thread control module shown in FIG. 5. The main thread control module 102 may include a calling unit 1201, an obtaining unit 1202 and an updating unit 1203.

The calling unit 1201 is used for calling the main thread of the current program.

The obtaining unit 1202 is used for obtaining computation results in a sub-thread of the current program.

After performing data computation and obtaining computation results in a sub-thread of the current program, the computation results may be returned to the main thread of the current program by the sub-thread of the current program, and the obtaining unit 1202 obtains the computation results returned by the sub-thread of the current program. Wherein, the computation results may include data objects obtained after sorting.

The updating unit 1203 is used for updating UI (user interface) of the current program in the main thread of the current program.

The step of updating UI (user interface) of the current program by the updating unit 1203 is actually in preparation of the display of data, i.e. loading sorted data objects in the user interface to facilitate subsequent display of data. The data processing module 103 is used for displaying the computation results on the user interface of the current program.

As described above, in the embodiments of the present disclosure, the relatively tedious and time consuming process of data computation is nm in a sub-thread of the program, and only data loading and display are run in the main thread of the program. The multithread working mode improves data processing efficiency and UI thread jam will not be caused even when the requested data is relatively big, thereby ensuring the smoothness of user interface threads, the stability of systems, and the display performance of user interfaces.

The present disclosure further discloses a mobile terminal that may comprise a data processing apparatus, the structure and functions of which are described in connection with any embodiment of FIGS. 5-8. It is understood that the mobile terminal of this embodiment of the present disclosure may also be used in the method of any embodiment shown in FIGS. 1-4.

As shown in FIG. 9, a communication system 100 may include a plurality of mobile terminals 200 connected to a network 120. The network 120 may include wireless network, cellular network, fiber network, or any network that can be connected to the Internet. The network 120 may include a "social network" that refers generally to a network of individuals, such as acquaintances, friends, family, colleagues, or co-workers, coupled via a communications network or via a variety of sub-networks. The social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like. The social network may include different groups of individuals with similar experiences, opinions, education levels or backgrounds. Each group may exist or be created according to user profiles of individuals, for example, in which a group member may belong to multiple groups. The mobile terminal 200 may be any computing device that can access to a network. For example, the mobile terminal 200 may include a phone, a smart phone, a media player, a tablet computer, a portable gaming device.

FIG. 10 shows an example of the mobile terminal 200 configured to implement the disclosed data processing method. The mobile terminal 200 includes a hardware processor 210 that is connected to a memory storage 220 and a display 230. The hardware processor 210 has access to the memory storage 220 and controls the display 230 based on instructions stored in the memory storage 220. The mobile terminal 200 includes a sensor 240 that is configured to communicate with other terminals directly or via a network.

As described above, in the embodiments of the present disclosure, the relatively tedious and time consuming process of data computation is nm in a sub-thread of the program, and only data loading and display are run in the main thread of the program. The multithread working mode improves data processing efficiency and UI thread jam will not be caused even when the requested data is relatively big, thereby ensuring the smoothness of user interface threads, the stability of systems, and the display performance of user interfaces.

It will be apparent to those of ordinary skill in the art that all or part of the process flow of the aforesaid embodiments may be implemented by hardware instructed by a computer program, and the computer program may be stored in a computer readable storage medium and the process flows of the embodiments of the various methods mentioned above may be included when the program is executed. Wherein, the computer readable storage medium may be a magnetic disk, an optical disk, a read-only memory (ROM) or a random access memory (RAM).

Disclosed above are preferred embodiments of the present disclosure and these preferred embodiments are not intended to be limiting the scope of the present disclosure, hence any equivalent variation made based on the claims of the present disclosure shall fall within the scope of the present disclosure.

The invention claimed is:

1. A data processing method implemented in a mobile device comprising a hardware processor, comprising:
   automatically creating in the main device and initiating a sub-thread of the current user interface program;
   performing, by the sub-thread of the current user interface program in the mobile device, data computation when receiving a data request from a user of the mobile device to view data stored in a folder on the mobile device, wherein performing the data computation in the sub-thread of the current user interface program comprises:
      initiating the sub-thread of the current user interface program:
      traversing the requested data by the sub-thread of the current user interface program to obtain all data stored under the folder of the mobile device:
      creating a data object based on the data obtained from the traversal and storing the data object in the local cache; and
      computation results including data objects obtained after sorting;
   loading the requested data from a local cache to a user interface (UI) of the current user interface program on the mobile device by the main thread of the current user interface program in the mobile device; the requested data based on results from the data computation; and
   displaying on the mobile device, by the main thread of the current user interface program in the mobile device, the loaded requested data.

2. The data processing method as defined in claim 1 wherein traversing the requested data in the sub-thread of the current user interface program, the method further comprises:
   initiating timing;
   determining whether a traversing process has ended when the timing duration reaches a preset threshold value;
   if the determination is yes, stop timing;
   if the determination is no, call the main thread of the current user interface program, and output progress prompt information in the main thread of the current user interface program.

3. The data processing method as defined in claim 2, wherein outputting progress prompt information in the main thread of the current user interface program, the method further comprises:
  stopping data computation process in the sub-thread of the current user interface program if a data cancellation instruction is received.

4. The data processing method as defined in claim 1, wherein loading the requested data in the main thread of the current user interface program based on the data computation results comprises:
  calling the main thread of the current user interface program to obtain the computation results in the sub-thread of the current user interface program, and updating user interface (UI) of the current user interface program in the main thread of the current user interface program.

5. The data processing method as defined in claim 4, wherein displaying the loaded requested data comprises:
  displaying the computation results on the UI of the current user interface program.

6. A data processing apparatus, comprising a processor and a non-transitory storage medium accessible to the processor, the non-transitory storage medium is configured to store:
  a sub-thread control module for performing data computation in a sub-thread of a current user interface program in a mobile device when a data request from a user of the mobile device to view data stored in a folder of the mobile device is received, wherein the sub-thread control module comprises:
  an initiating unit for initiating a sub-thread of the current user interface program;
  a traversing unit for traversing the requested data in the sub-thread of the current user interface program to obtain all data stored under the folder of the mobile device;
  from the traversal and storing the data object in the local cache; and
  a sorting unit for sorting the data object to obtain computation results, the computation results including data objects obtained after sorting;
  a main thread control module for loading the requested data from a local cache to a user interface (UI) of the current user interface program by a main thread of the current user interface program based on data computation results; and
  a data processing module for displaying on the mobile device by the main thread of the current user interface program, the loaded requested data.

7. The data processing apparatus as defined in claim 6, wherein the sub-thread control module further comprises:
  a timing unit configured to initiate timing;
  a determining unit for determining whether a traversing process has ended when the timing duration reaches a preset threshold value; and
  a control unit for notifying the timing unit to stop timing, if a determination is yes; or for notifying the main thread control module to call the main thread of the current user interface program and to output progress prompt information in the main thread of the current user interface program, if the determination is no.

8. The data processing apparatus as defined in claim 7, wherein after outputting progress prompt information in the main thread of the current user interface program, the control unit is configured to stop data computation process in the sub-thread of the current program if a data cancellation instruction is received.

9. The data processing apparatus as defined in claim 6, wherein the main thread control module comprises:
  a calling unit for calling the main thread of the current user interface program;
  an obtaining unit for obtaining computation results in the sub-thread of the current user interface program; and
  an updating unit for updating the user interface (UI) of the current user interface program in the main thread of the current user interface program.

10. The data processing apparatus as defined in claim 9, wherein the data processing module is used for displaying the computation results on the user interface (UI) of the current user interface program.

11. A mobile terminal comprising a processor and a non-transitory storage medium accessible to the processor, the processor is configured to:
  perform data computation in a sub-thread of a current user interface program when a data request from a user of the mobile terminal to view data stored in a folder of the mobile terminal, wherein when performing the computation in the sub-thread, the processor is further configured to:
  initiate the sub-thread of the current user interface program;
  traverse the requested data in the sub-thread of the current user interface program to obtain all data stored under the folder of the mobile device;
  create a data object based on the data obtained from the traversal and store the data object in the local cache; and
  sort the data object to obtain computation results, the computation results including data objects obtained after sorting;
  load the requested data from a local cache to a user interface (UI) of the current user interface program on the mobile terminal by a main thread of the current user interface program based on results from the data computation; and
  display on the mobile terminal by the main thread of the current user interface program, the loaded requested data.

12. The mobile terminal as defined in claim 11, wherein the processor is further configured to:
  initiate timing;
  determine whether a traversing process has ended when the timing duration reaches a preset threshold value; and
  if the determination is yes, stop timing; if the determination is no, call the main thread of the current user interface program, and output progress prompt information in the main thread of the current user interface program.

* * * * *